(12) United States Patent
Andoh

(10) Patent No.: US 10,850,823 B2
(45) Date of Patent: Dec. 1, 2020

(54) SHIP OPERATION MANAGEMENT SYSTEM

(71) Applicant: KAWASAKI JUKOGYO KABUSHIKI KAISHA, Kobe (JP)

(72) Inventor: Akihiro Andoh, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 187 days.

(21) Appl. No.: 16/315,791

(22) PCT Filed: Jun. 27, 2017

(86) PCT No.: PCT/JP2017/023478
§ 371 (c)(1),
(2) Date: Jan. 7, 2019

(87) PCT Pub. No.: WO2018/008455
PCT Pub. Date: Jan. 11, 2018

(65) Prior Publication Data
US 2019/0241244 A1 Aug. 8, 2019

(30) Foreign Application Priority Data
Jul. 5, 2016 (JP) ................... 2016-133021

(51) Int. Cl.
B63H 21/21 (2006.01)
B63B 25/16 (2006.01)
(Continued)

(52) U.S. Cl.
CPC ............ B63H 21/21 (2013.01); B63B 25/16 (2013.01); B63B 49/00 (2013.01); B63H 21/14 (2013.01);
(Continued)

(58) Field of Classification Search
CPC ........ B63H 21/21; B63H 25/04; B63H 21/14; B63B 49/00; B63B 25/16; G08G 3/00;
(Continued)

(56) References Cited

U.S. PATENT DOCUMENTS 6,460,350 B2* 10/2002 Johnson .................... F17C 9/02
62/48.1
2005/0126220 A1* 6/2005 Ward ..................... F25J 3/0403
62/625

(Continued)

FOREIGN PATENT DOCUMENTS

JP 4247497 B2 4/2009
JP 2016-193124 A 11/2016

OTHER PUBLICATIONS

Hasan et al. "Minimizing Boil-Off Losses in Liquefied Natural Gas Transportation." Industrial & Engineering Chemistry Research, Feb. 24, 2009, vol. 48, No. 21, pp. 9571-9580.
(Continued)

Primary Examiner — Rodney A Butler
(74) Attorney, Agent, or Firm — Oliff PLC

(57) ABSTRACT

An LNG carrier which uses natural gas generated by vaporization of LNG as propulsive fuel and including cargo tank, spray apparatus, and carrier communication device; land-based equipment including land-based communication device and processing device; processing device including: first vapor quantity estimating section which estimates total quantity of natural vapor generated from the LNG remaining in the cargo tank in a case where the LNG carrier is traveling on planned ballast course, based on sea weather data; a second vapor quantity estimating section which estimates a total quantity of spray vapor generated by performing spraying operations in a case where the LNG carrier is traveling on planned ballast course, based on the sea weather data; and heel quantity calculating section which calculates required (Continued)

heel quantity, by summing the total quantity of natural vapor and spray vapor, and the land-based communication device transmits the required heel quantity to the carrier communication device.

8 Claims, 3 Drawing Sheets

(51) Int. Cl.
      *F17C 13/02*       (2006.01)
      *B63B 49/00*       (2006.01)
      *G08G 3/00*       (2006.01)
      *B63H 25/04*       (2006.01)
      *B63H 21/14*       (2006.01)

(52) U.S. Cl.
    CPC ............. *B63H 25/04* (2013.01); *F17C 13/02* (2013.01); *G08G 3/00* (2013.01); *F17C 2201/0128* (2013.01); *F17C 2201/0157* (2013.01); *F17C 2201/052* (2013.01); *F17C 2205/013* (2013.01); *F17C 2221/033* (2013.01); *F17C 2223/0153* (2013.01); *F17C 2223/0161* (2013.01); *F17C 2223/033* (2013.01); *F17C 2227/0339* (2013.01); *F17C 2250/032* (2013.01); *F17C 2250/034* (2013.01); *F17C 2260/016* (2013.01); *F17C 2265/066* (2013.01); *F17C 2270/0105* (2013.01); *Y02T 70/5218* (2013.01)

(58) Field of Classification Search
    CPC ................ F17C 13/02; F17C 2205/013; F17C 2201/052; F17C 2265/066; F17C 2223/033; F17C 2227/0339; F17C 2250/032; F17C 2260/016; F17C 2250/034; F17C 2221/033; F17C 2201/0128; F17C 2201/0157; F17C 2223/0153; F17C 2223/0161; F17C 2270/0105; Y02T 70/5218; Y02T 70/50; G07C 5/0816; B63J 2099/003
    See application file for complete search history.

(56) References Cited

U.S. PATENT DOCUMENTS

| | | | |
|---|---|---|---|
| 2008/0190117 A1* | 8/2008 | Lee | F17C 3/00 62/47.1 |
| 2010/0011663 A1* | 1/2010 | Coyle | F25J 1/0214 48/127.3 |
| 2012/0017639 A1* | 1/2012 | Peterson | C10G 31/11 62/611 |
| 2012/0180502 A1* | 7/2012 | Morris | F17C 11/007 62/47.1 |
| 2014/0041398 A1* | 2/2014 | Aoki | F25J 1/0025 62/48.2 |
| 2018/0320637 A1* | 11/2018 | Lee | F25J 1/005 |

OTHER PUBLICATIONS

Dobrota et al. "Problem of Boil-off in LNG Supply Chain." Transactions on Maritime Science, Feb. 2013, vol. 2, No. 2, 91-100.

* cited by examiner

SHIP OPERATION MANAGEMENT SYSTEM

TECHNICAL FIELD

The present invention relates to a ship operation management system for an LNG (Liquefied Natural Gas) carrier (cargo ship).

BACKGROUND ART

Conventionally, there is known a ship operation management system which communicates information between a ship (marine vessel) and land-based equipment. For example, Patent Literature 1 discloses a ship operation management system in which the land-based equipment derives an optimal course (sea route) based on sea weather data, or the like, and transmits this optimal course to the ship.

CITATION LIST

Patent Literature

Patent Literature 1: Japanese Patent No. 4247497

SUMMARY OF INVENTION

Technical Problem

As an exemplary ship, there is an LNG carrier which includes cargo tanks for storing LNG therein, and uses a natural gas generated by vaporization of the LNG, as propulsive fuel. In this LNG carrier, in order to unload the LNG as much as possible, there is a need to accurately know an LNG quantity required for a ballast voyage (ballast passage) (voyage from an unloading base to a loading base), during a laden voyage (voyage from the loading base to the unloading base), namely, a heel quantity to be left inside the cargo tanks.

In view of the above, an object of the present invention is to provide a ship operation management system which is capable of accurately calculating the heel quantity required for the ballast voyage during the laden voyage.

Solution to Problem

To solve the above-described problem, a ship operation management system of the present invention comprises a liquefied natural gas (LNG) carrier which uses a natural gas generated by vaporization of LNG, as propulsive fuel, the LNG carrier including a cargo tank which stores the LNG therein, a spray apparatus which performs spraying operations for spraying the LNG to an inner surface of the cargo tank, and a carrier communication device; and land-based equipment including a land-based communication device which is capable of communicating with the carrier communication device, and a processing device, wherein the processing device includes: a first vapor quantity estimating section which estimates a total quantity of a natural vapor generated from the LNG remaining in the cargo tank in a case where the LNG carrier is traveling on a planned ballast course, based on sea weather data; a second vapor quantity estimating section which estimates a total quantity of a spray vapor generated by performing the spraying operations in a case where the LNG carrier is traveling on the planned ballast course, based on the sea weather data; and a heel quantity calculating section which calculates a required heel quantity, by adding up the total quantity of the natural vapor which is estimated by the first vapor quantity estimating section and the total quantity of the spray vapor which is estimated by the second vapor quantity estimating section, wherein the land-based communication device transmits the required heel quantity to the carrier communication device, while the LNG carrier is on a laden voyage.

During a ballast voyage, the capacity of a gas-phase region inside the cargo tank is much larger than the capacity of a liquid-phase region inside the cargo tank. In addition, the temperature of a portion of the cargo tank, the portion surrounding the gas-phase region, tends to increase, due to an outside air temperature. Therefore, it is necessary to frequently perform the spraying operations for spraying the LNG to the inner surface of the cargo tank to cool the cargo tank. By the spraying operations, a large quantity of vapor is generated. Further, if a hull shakes due to waves or wind, the quantity of the natural vapor generated from the LNG inside the cargo tank changes.

For such a ballast voyage, in the above-described configuration, the required heel quantity is calculated by estimating the total quantity of the natural vapor and the total quantity of the spray vapor in a case where the LNG carrier is traveling on the planned ballast course, based on the sea weather data, and by adding up the estimated total quantity of the natural vapor and the estimated total quantity of the spray vapor. This makes it possible to accurately calculate the required heel quantity. The calculated required heel quantity is transmitted to the LNG carrier during the laden voyage. Therefore, with reference to the required heel quantity, a crew of the LNG carrier can decide an LNG quantity to be unloaded so that the LNG quantity to be unloaded becomes maximum.

The processing device may include an optimal course deriving section which derives an optimal ballast course with which a fuel consumption quantity is minimum, based on the sea weather data, and the planned ballast course may be the optimal ballast course. In accordance with this configuration, the calculated required heel quantity can be made minimum.

For example, the first vapor quantity estimating section may estimate the total quantity of the natural vapor by deriving a generation quantity of the natural vapor per unit time based on the sea weather data so that the generation quantity changes due to influences of rolling and pitching of the LNG carrier, and by adding up generation quantities of the natural vapor per unit time for a ballast voyage period.

For example, the second vapor quantity estimating section may estimate the total quantity of the spray vapor by deciding timings of the spraying operations based on the sea weather data so that a temperature of the cargo tank on a reference point is kept at a predetermined temperature or lower, and by adding up generation quantities of the spray vapor in the spraying operations for a ballast voyage period.

Advantageous Effects of Invention

In accordance with the present invention, it is possible to accurately calculate a heel quantity required for a ballast voyage during a laden voyage.

DESCRIPTION OF EMBODIMENTS

Figure 1:
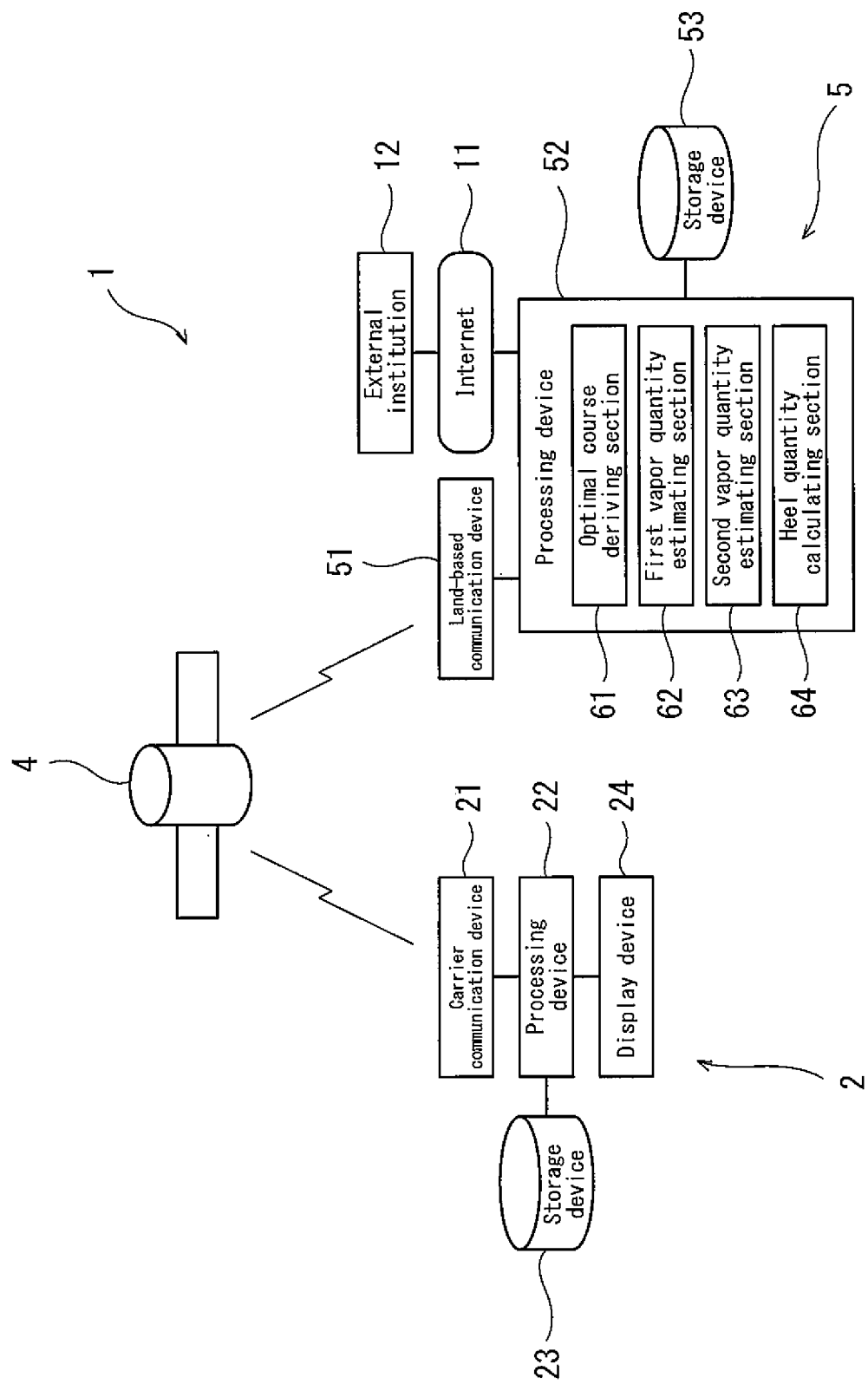
FIG. 1 is a schematic view showing the configuration of a ship operation management system according to one embodiment of the present invention.

FIG. 1 shows a ship operation management system 1 according to one embodiment of the present invention. This ship operation management system 1 includes an LNG carrier (cargo ship) 2 and land-based equipment 5.

Figure 2:
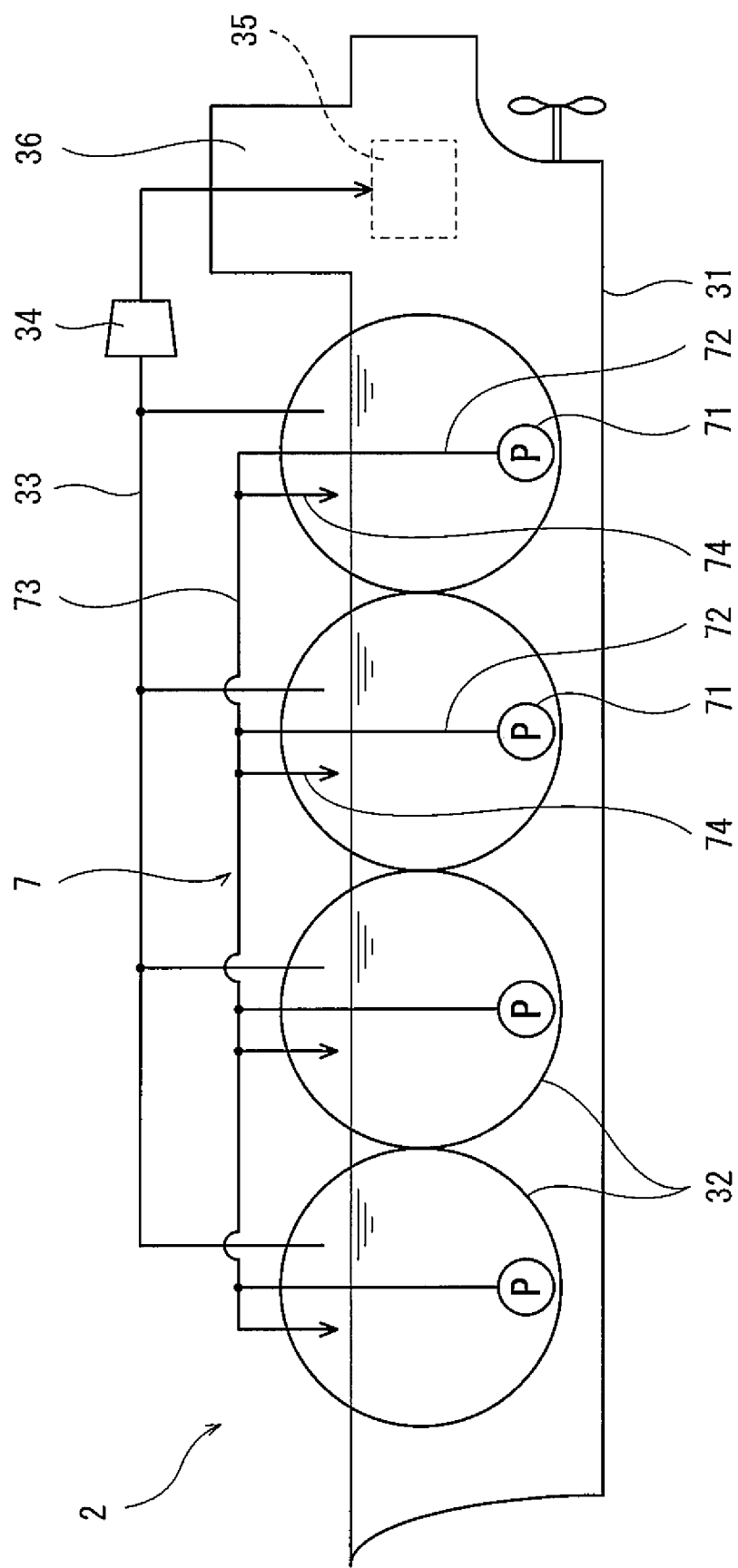
FIG. 2 is a schematic view showing the overall construction of an LNG carrier.

As shown in FIG. 2, the LNG carrier 2 includes a hull 31 and a plurality of cargo tanks 32 mounted on the hull 31 to store LNG therein. The hull 31 is provided with a bridge 36 at a location that is rearward of the cargo tanks 32. In the present embodiment, each of the cargo tanks 32 is a spherical Moss-type tank. Alternatively, each of the cargo tanks 32 may be a membrane tank or a self-supporting prismatic (SPB) tank.

The LNG carrier 2 is equipped with a spray apparatus 7 for cooling each of the cargo tanks 32. The spray apparatus 7 includes a plurality of pumps 71 disposed at the bottoms of the cargo tanks 32, respectively, a collecting pipe 73 disposed outside the cargo tanks 32, discharge pipes 72 connecting the pumps 71 to the collecting pipe 73, and spray pipes 74 extending from the collecting pipe 73 into the cargo tanks 32, respectively. The spray apparatus 7 performs spraying operations for spraying the LNG stored in each of the cargo tanks 32 to the inner surface of this cargo tank 32 via the corresponding pump 71, the corresponding discharge pipe 72, the collecting pipe 73, and the corresponding spray pipe 74.

The LNG carrier 2 uses a natural gas (also referred to as boil-off gas (BOG)) generated by vaporization of the LNG, as propulsive fuel. Specifically, the LNG carrier 2 includes a main engine 35 which drives a screw propeller, and a supply line 33 which leads the natural gas from each of the cargo tanks 32 to the main engine 35. The supply line 33 is provided with a compressor 34.

The main engine 35 may be any engine so long as the main engine 35 is capable of combusting the natural gas to obtain driving power. For example, the main engine 35 may be a reciprocating engine, a gas turbine engine, a combination of a gas-burning boiler and a steam turbine, or the like. The reciprocating engine may be a pure gas engine which combusts only the natural gas, or a dual fuel engine which combusts one of or both of the natural gas and fuel oil.

The bridge 36 of the LNG carrier 2 is provided with a carrier communication device (communication device mounted in the LNG carrier 2) 21, a processing device 22, a storage device 23, and a display device 24. The processing device 22, the storage device 23, and the display device 24 are disposed inside an operating room. For example, the processing device 22 and the storage device 23 are a computer including memories such as ROM and RAM, and CPU. Programs stored in the ROM are executed by the CPU. The storage device 23 may be comprised of a memory of a computer and a data logger connected to the computer.

The storage device 23 contains sea chart data, voyage plan data, or the like, which have been previously stored therein. For example, these data are input to the processing device 22 via an input device (not shown) and the processing device 22 stores these data in the storage device 23.

The processing device 22 stores in the storage device 23, voyage actual measurement data measured by sensors (not shown), such as a ship speed or position information (latitude and longitude). The processing device 22 outputs the voyage actual measurement data stored in the storage device 23 to the carrier communication device 21 and causes the display device 24 to display the voyage actual measurement data. The carrier communication device 21 transmits the voyage actual measurement data output from the processing device 22 to a land-based communication device 51 which will be described later, via a communication satellite 4. The carrier communication device 21 receives management data including an optimal ballast course which will be described later, from the land-based communication device 51. The processing device 22 stores in the storage device 23 the management data received by the carrier communication device 21, and causes the display device 24 to display the management data.

The land-based equipment 5 includes the land-based communication device 51, a processing device 52, and a storage device 53. The land-based communication device 51 is able to communicate with the carrier communication device 21 via the communication satellite 4. For example, the processing device 52 and the storage device 53 are a computer including memories such as ROM and RAM and CPU. Programs stored in the ROM are executed by the CPU. The storage device 53 may be comprised of a memory of a computer and a data logger connected to the computer.

The storage device 53 contains sea chart data, voyage schedule data (departure date and arrival date of the laden voyage, departure date and arrival date of the ballast voyage), or the like, which have been previously stored therein. For example, these data are input to the processing device 52 via an input device (not shown), and the processing device 52 stores these data in the storage device 53.

The processing device 52 stores in the storage device 53, the voyage actual measurement data received by the land-based communication device 51. The processing device 52 is connected to Internet 11. The processing device 52 obtains sea weather data from external institutions 12 such as meteorological bureau and NOAA (National Ocean and Atmospheric Administration) via the Internet 11, and stores the obtained sea weather data in the storage device 53. The storage device 53 may be a single unit, or may be divided into a unit in which the voyage actual measurement data is stored and a unit in which the sea weather data is stored.

The processing device 52 performs calculations by use of the seat chart data, the voyage schedule data, the voyage actual measurement data, and the sea weather data which are stored in the storage device 53 to create management data. For example, in a case where the LNG carrier 2 is on the laden voyage, the management data includes an optimal laden course (sea route) on which the LNG carrier 2 will be traveling and an optimal ballast course. The processing device 52 stores the created management data in the storage device 53 and outputs the created management data to the land-based communication device 51. The land-based communication device 51 transmits the management data output from the processing device 52 to the carrier communication device 21 via the communication satellite 4.

Next, the processing device 52 of the land-based equipment 5 will be described in more detail. The processing device 52 includes an optimal course deriving section 61, a first vapor quantity estimating section 62, a second vapor quantity estimating section 63, and a heel quantity calculating section 64.

The optimal course deriving section 61 derives an optimal course (sea route) with which a fuel consumption quantity is minimum, based on the sea weather data stored in the storage device 53. For example, in a case where the LNG carrier 2 is on the laden voyage, the optimal course deriving section 61 derives an optimal laden course on which the LNG carrier 2 will be traveling, and an optimal ballast course. The optimal ballast course corresponds to a planned ballast course of the present invention.

Figure 3:
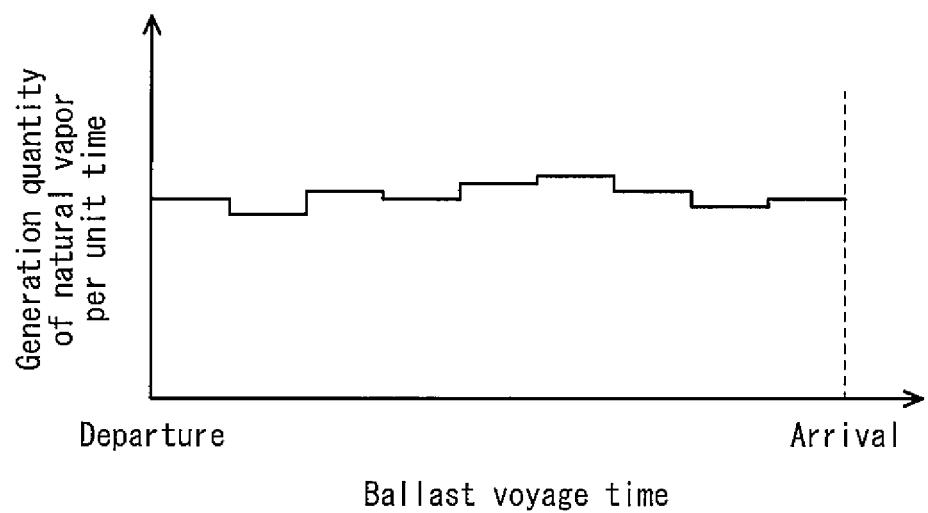
FIG. 3 is a graph showing a change over time of a generation quantity of a natural vapor per unit time, during a predicted ballast voyage.

The first vapor quantity estimating section 62 estimates a total quantity Qn of a natural vapor generated from the LNG remaining in the cargo tanks 32 in a case where the LNG carrier 2 is traveling on the optimal ballast course, based on the sea weather data stored in the storage device 53. Specifically, as shown in FIG. 3, the first vapor quantity estimating section 62 estimates the total quantity Qn of the natural vapor by deriving a generation quantity of the natural vapor per unit time, based on the sea weather data, and by adding up generation quantities of the natural vapor per unit time for a ballast voyage period. The unit time of the generation quantity of the natural vapor may be 1 hour, 12 hours (half a day), or 24 hours (1 day).

More specifically, the first vapor quantity estimating section 62 derives when and to what degree the LNG carrier 2 rolls and pitches in a case where the LNG carrier 2 is traveling on the optimal ballast course, based on the sea weather data, in particular, wave information and wind information. Then, the first vapor quantity estimating section 62 derives the generation quantity of the natural vapor per unit time so that the generation quantity changes due to the influences of the rolling and the pitching of the LNG carrier 2.

For example, the first vapor quantity estimating section 62 may derive the generation quantity of the natural vapor per unit time by calculating a reference generation quantity generated from the LNG remaining in the cargo tanks 32 in a state in which the hull 31 is not shaking and by multiplying the reference generation quantity by a shaking motion coefficient (e.g., 1 or more) corresponding to the degree of the rolling and the degree of the pitching of the LNG carrier 2. For example, the shaking motion coefficient may increase as the degree of the rolling and the degree of the pitching of the LNG carrier 2 increase, or may be a value close to 1 in a case where the rolling with an equal degree and the pitching with an equal degree continue.

Figure 4:
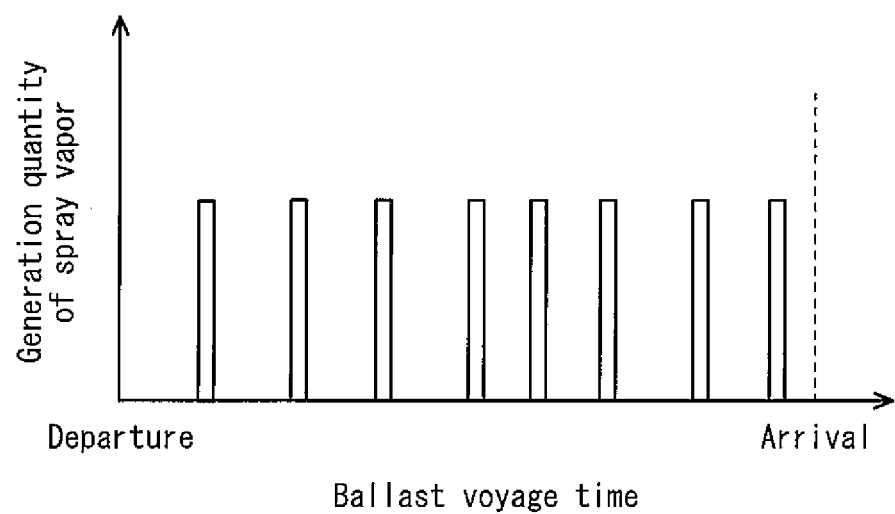
FIG. 4 is a graph showing a change over time of a generation quantity of a spray vapor, during the predicted ballast voyage.

The second vapor quantity estimating section 63 estimates a total quantity Qs of a spray vapor generated by performing the spraying operations in a case where the LNG carrier 2 is traveling on the optimal ballast course, based on the sea weather data stored in the storage device 53. Specifically, as shown in FIG. 4, the second vapor quantity estimating section 63 estimates the total quantity Qs of the spray vapor, by deciding the timings of the spraying operations based on the sea weather data and by adding up generation quantities of the spray vapor in the spraying operations for the ballast voyage period. Although in the example of FIG. 4, the generation quantity of the spray vapor is constant (equal) throughout the spraying operations, the generation quantity of the spray vapor may be different between the spraying operations.

More specifically, the second vapor quantity estimating section 63 decides the timings of the spraying operations based on the sea weather data, in particular, temperature information so that the temperature of each of the cargo tanks 32 on a reference point (point on an equator in the case of the Moss-type tank) is kept at a predetermined temperature (e.g., −110 degrees C.) or lower. For example, the second vapor quantity estimating section 63 may decide a time schedule so that the spraying operations are initiated at time points when the temperature of each of the cargo tanks 32 on the reference point increases up to a predetermined temperature. Or, the second vapor quantity estimating section 63 may decide the time schedule so that the spraying operations are initiated at time intervals at which a situation in which the temperature of each of the cargo tanks 32 on the reference point increases up to the predetermined temperature can be reliably prevented.

The heel quantity calculating section 64 calculates a required heel quantity Qh by adding up the total quantity Qn of the natural vapor which is estimated by the first vapor quantity estimating section 62 and the total quantity Qs of the spray vapor which is estimated by the second vapor quantity estimating section 63 (Qh=Qn+Qs). The calculated required heel quantity Qh is output from the processing device 52 to the land-based communication device 51. The land-based communication device 51 transmits the required heel quantity Qh to the carrier communication device 21 while the LNG carrier 2 is on the laden voyage.

As described above, in the ship operation management system 1 of the present embodiment, the total quantity Qn of the natural vapor and the total quantity Qs of the spray vapor in a case where the LNG carrier 2 is traveling on the optimal ballast course are estimated based on the sea weather data, and the required heel quantity Qh is calculated by adding up the total quantity Qn of the natural vapor and the total quantity Qs of the spray vapor. This makes it possible to accurately calculate the required heel quantity Qh. The calculated required heel quantity Qh is transmitted to the LNG carrier 2 while the LNG carrier 2 is on the laden voyage. Therefore, with reference to the required heel quantity Qh, a crew of the LNG carrier 2 can decide an LNG quantity to be unloaded so that the LNG quantity to be unloaded becomes maximum.

Modified Example

The present invention is not limited to the above-described embodiment, and can be modified variously within the scope of the invention.

For example, the planned ballast course of the present invention is not limited to the optimal ballast course with which the fuel consumption quantity is minimum. For example, the planned ballast course may be a great-circle course connecting the unloading base and the loading base to each other over a shortest distance. Note that the calculated required heel quantity Qh can be made minimum in a case where the planned ballast course is the optimal ballast course, like the above-descried embodiment.

REFERENCE SIGNS LIST

1 ship operation management system
2 LNG carrier
21 carrier communication device
32 cargo tank
5 land-based equipment
51 land-based communication device
52 processing device
61 optimal course deriving section
62 first vapor quantity estimating section
63 second vapor quantity estimating section
64 heel quantity calculating section
7 spray apparatus

The invention claimed is:

1. A ship operation management system comprising:
a liquefied natural gas (LNG) carrier which uses a natural gas generated by vaporization of LNG, as propulsive fuel, the LNG carrier including a cargo tank which stores the LNG therein, a spray apparatus which performs spraying operations for spraying the LNG to an inner surface of the cargo tank, and a carrier communication device; and
land-based equipment including a land-based communication device which is capable of communicating with the carrier communication device, and a processing device,
wherein the processing device includes:
a first vapor quantity estimating section which estimates a total quantity of a natural vapor generated from the LNG remaining in the cargo tank in a case where the LNG carrier is traveling on a planned ballast course, based on sea weather data;
a second vapor quantity estimating section which estimates a total quantity of a spray vapor generated by performing the spraying operations in a case where the LNG carrier is traveling on the planned ballast course, based on the sea weather data; and
a heel quantity calculating section which calculates a required heel quantity, by adding up the total quantity of the natural vapor which is estimated by the first vapor quantity estimating section and the total quantity of the spray vapor which is estimated by the second vapor quantity estimating section,
wherein the land-based communication device transmits the required heel quantity to the carrier communication device, while the LNG carrier is on a laden voyage.

2. The ship operation management system according to claim 1,
wherein the processing device includes an optimal course deriving section which derives an optimal ballast course with which a fuel consumption quantity is minimum, based on the sea weather data, and
wherein the planned ballast course is the optimal ballast course.

3. The ship operation management system according to claim 1,
wherein the first vapor quantity estimating section estimates the total quantity of the natural vapor by deriving a generation quantity of the natural vapor per unit time based on the sea weather data so that the generation quantity changes due to influences of rolling and pitching of the LNG carrier, and by adding up generation quantities of the natural vapor per unit time for a ballast voyage period.

4. The ship operation management system according to claim 1,
wherein the second vapor quantity estimating section estimates the total quantity of the spray vapor by deciding timings of the spraying operations based on the sea weather data so that a temperature of the cargo tank on a reference point is kept at a predetermined temperature or lower, and by adding up generation quantities of the spray vapor in the spraying operations for a ballast voyage period.

5. The ship operation management system according to claim 2,
wherein the first vapor quantity estimating section estimates the total quantity of the natural vapor by deriving a generation quantity of the natural vapor per unit time based on the sea weather data so that the generation quantity changes due to influences of rolling and pitching of the LNG carrier, and by adding up generation quantities of the natural vapor per unit time for a ballast voyage period.

6. The ship operation management system according to claim 2,
wherein the second vapor quantity estimating section estimates the total quantity of the spray vapor by deciding timings of the spraying operations based on the sea weather data so that a temperature of the cargo tank on a reference point is kept at a predetermined temperature or lower, and by adding up generation quantities of the spray vapor in the spraying operations for a ballast voyage period.

7. The ship operation management system according to claim 3,
wherein the second vapor quantity estimating section estimates the total quantity of the spray vapor by deciding timings of the spraying operations based on the sea weather data so that a temperature of the cargo tank on a reference point is kept at a predetermined temperature or lower, and by adding up generation quantities of the spray vapor in the spraying operations for a ballast voyage period.

8. The ship operation management system according to claim 5,
wherein the second vapor quantity estimating section estimates the total quantity of the spray vapor by deciding timings of the spraying operations based on the sea weather data so that a temperature of the cargo tank on a reference point is kept at a predetermined temperature or lower, and by adding up generation quantities of the spray vapor in the spraying operations for a ballast voyage period.

* * * * *